Figure 11:
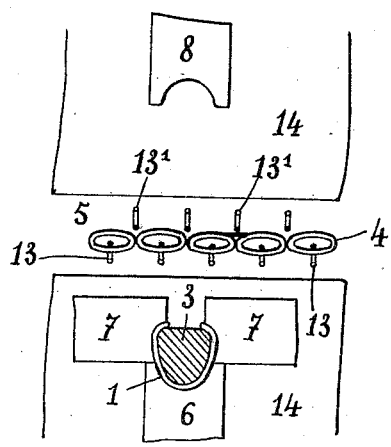

N. CHARGUERAUD.
MACHINE FOR MAKING CHAIN MAIL FABRIC.
APPLICATION FILED JAN. 23, 1915.
1,163,067.
Patented Dec. 7, 1915.
6 SHEETS—SHEET 1.
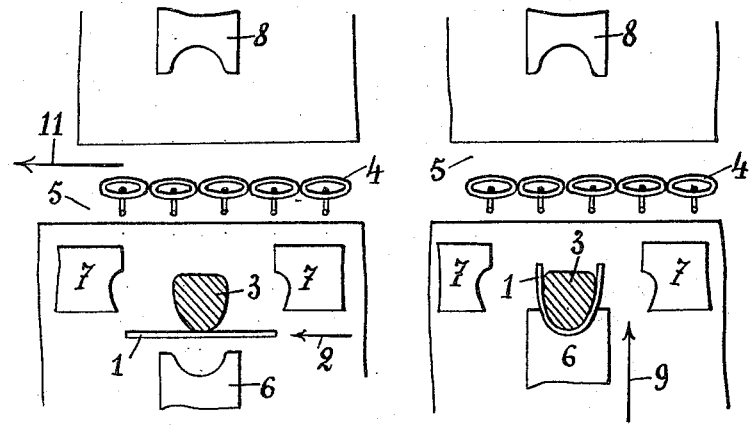
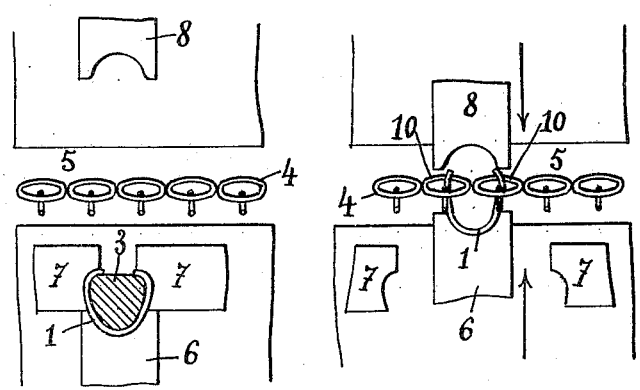
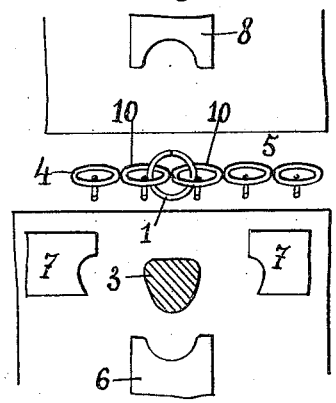
Witnesses:
Fred White
René Bruine
Inventor:
Napoleon Chargueraud,
By Attorneys,
Fraser, Dunk & Myers

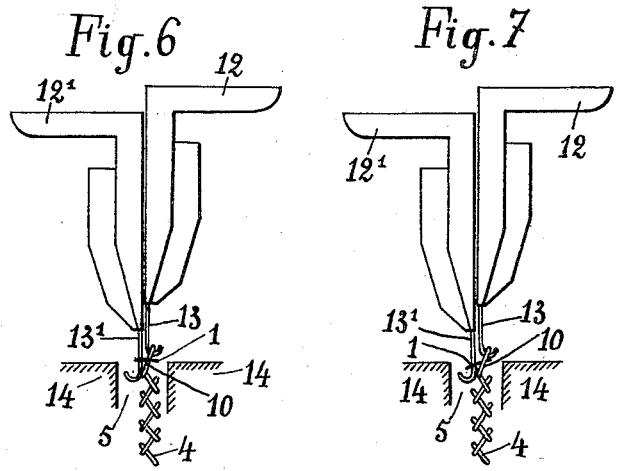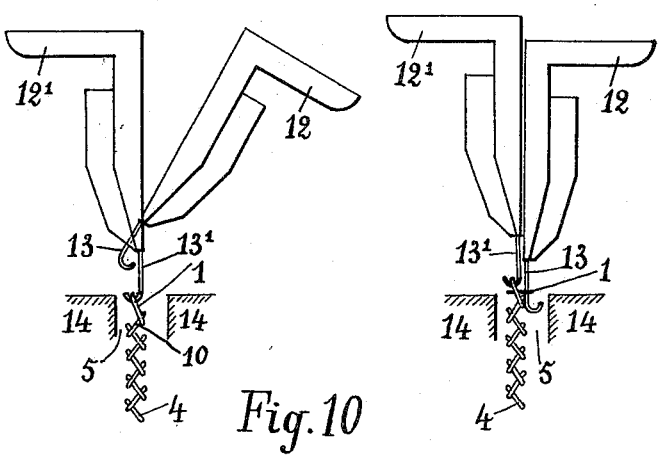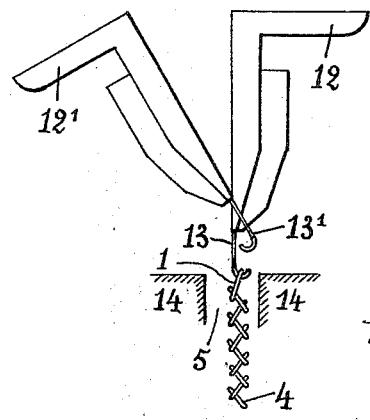

N. CHARGUERAUD.
MACHINE FOR MAKING CHAIN MAIL FABRIC.
APPLICATION FILED JAN. 23, 1915.

1,163,067.

Patented Dec. 7, 1915.
6 SHEETS—SHEET 3.

Witnesses:

Inventor:
Napoleon Chargueraud,
By Attorneys,

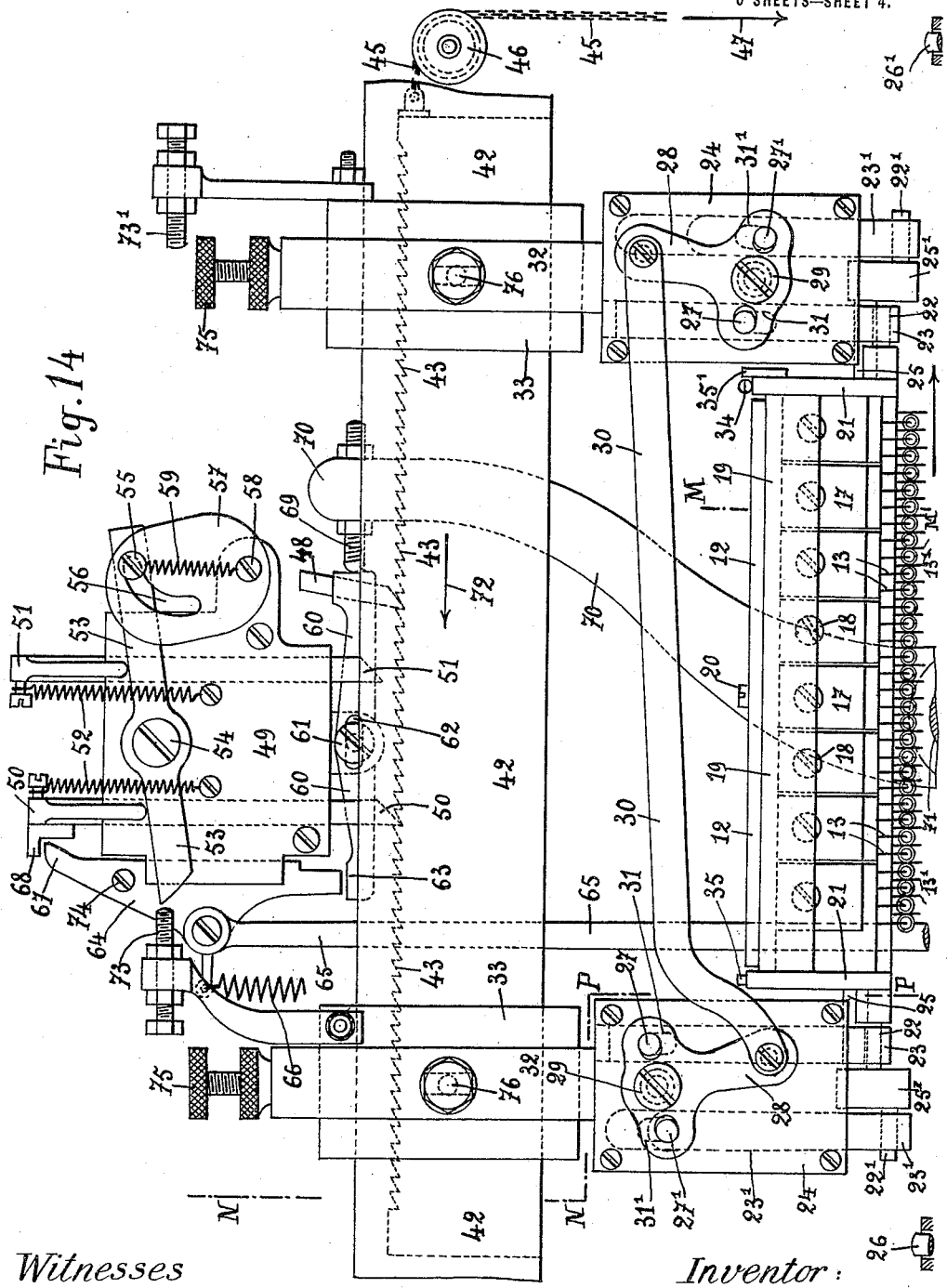

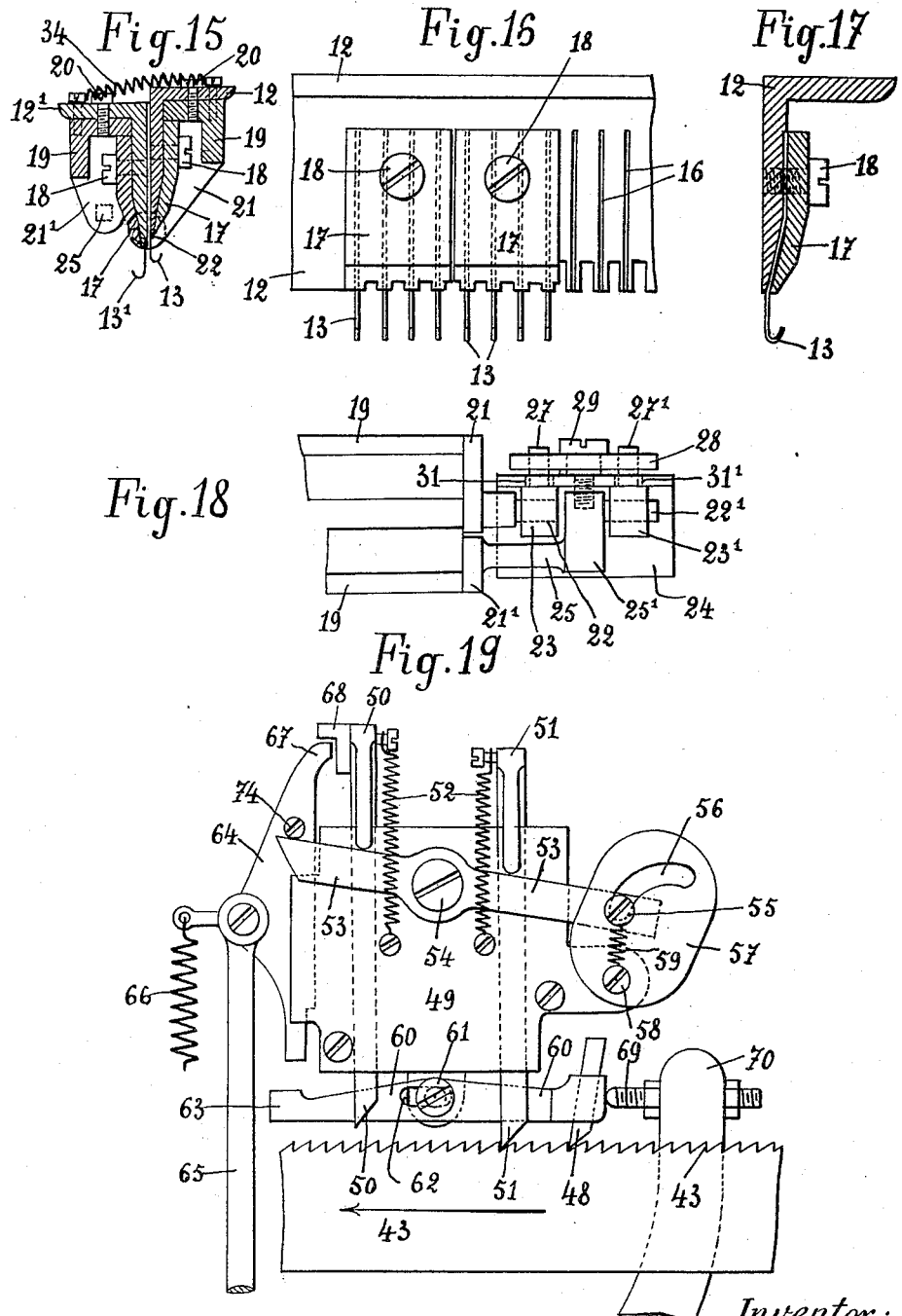

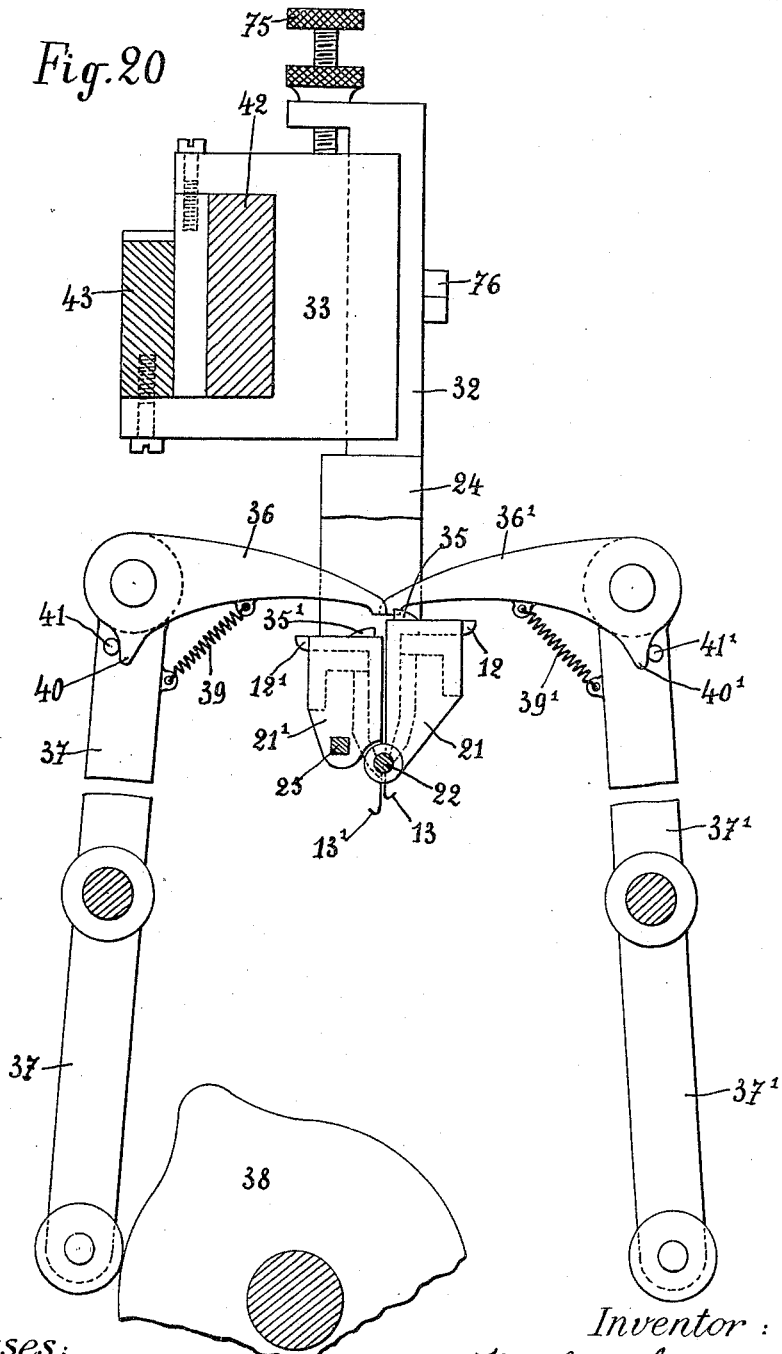

UNITED STATES PATENT OFFICE.

NAPOLEON CHARGUERAUD, OF PARIS, FRANCE.

MACHINE FOR MAKING CHAIN-MAIL FABRIC.

1,163,067.

Specification of Letters Patent. Patented Dec. 7, 1915.

Application filed January 23, 1915. Serial No. 3,966.

*To all whom it may concern:*

Be it known that I, NAPOLEON CHARGUERAUD, a citizen of the Republic of France, residing in Paris, France, have invented a certain new and useful Improved Machine for Making Chain-Mail Fabric, of which the following is a specification.

The object of the present invention is to provide a machine for the automatic rapid and economical manufacture of metallic net or mesh work called coat-of-mail or chain-mail. Such chain-mail is made up by successive horizontal rows of rings or links, which are successively produced from lengths of metallic wire which are cut, bent, curved and finally closed in such a manner that each finished ring connects two adjacent rings of the row previously made. In the actual manufacture the last row of rings or links of the work or coat of mail made upon the machine is suspended from the hooks of a comb adapted to be moved downwardly. The comb is carried by a rod upon which it slides in a horizontal direction by an amount corresponding to the distance between two adjacent rings each time after a ring has been formed in the upper row during the operation.

According to the method of manufacture hitherto used and above referred to the network was suspended in the course of its manufacture from a vertical comb, each of the rings or links of the upper row being suspended from a hook of the comb. The annular links were made one by one by inserting the two ends of a length of metallic wire bent into U shape into two adjacent rings of the previous row, and moving the two ends of the U-shaped wire toward each other so as to form a closed ring. During this operation the new rings were supported only by the network already produced, and therefore, they hung against the fabric, being retained only by the fabric and not being supported by any additional mechanical means. When the upper row was finished the comb had to be removed from the rod forming the upper support, and the work had to be transferred from the comb referred to to another comb placed outside the machine by inserting each ring of the row last produced upon a corresponding hook of the new comb. This operation of replacing after the completion of each row of rings, one comb by another comb, for the purpose of suspending the work by the completed row of rings, involved a considerable loss of time.

It is one of the objects of the machine forming the subject of the present invention to obviate this loss of time while producing various improvements presently to be described.

The preferred construction of the machine is shown in the accompanying drawings, in which—

Figure 12:
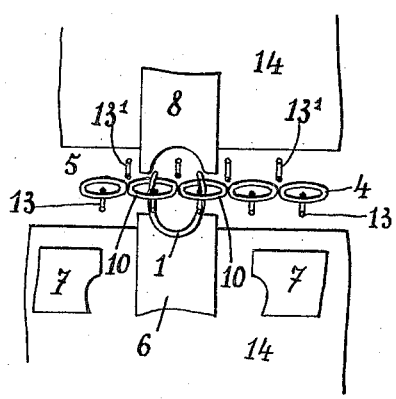
Figure 13:
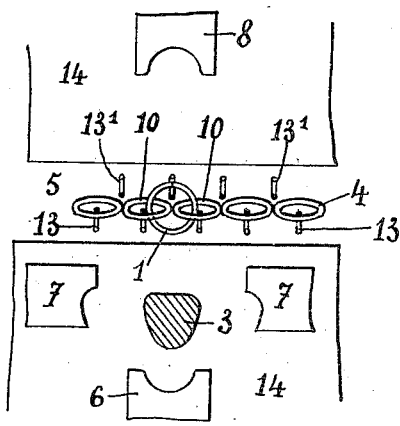

Figures 1 to 5 inclusive are fragmentary horizontal views showing the successive steps in the formation of a ring or link. Figs. 6 to 10 inclusive are end elevations of the hook carrying combs showing in section a fragment of the table, the respective views showing successive steps in the operation. Figs. 11, 12 and 13 are views corresponding respectively to Figs. 3, 4 and 5 showing the parts more completely. Fig. 14 is a sectional front elevation showing the combs and their operating mechanism. Fig. 15 is a transverse section of the combs. Fig. 16 is a fragmentary front elevation of one comb of which Fig. 17 is a cross-section. Fig. 18 is a plan of one end of the two combs and their supporting slides and the means for imparting vertical movement thereto. Fig. 19 is a fragment showing the upper part of Fig. 14 with the parts in a different position. Fig. 20 is a transverse section on the line N—P in Fig. 14.

It may be advisable to recapitulate first the several steps by which each ring of a row is formed. The metallic wire 1 made of any suitable metal is introduced in the direction of the arrow 2 (see Fig. 1), against the front part of a vertical mandrel 3 which is then raised by means of a cam (not shown in the drawings) somewhat above the table of the machine. The network in course of preparation is indicated by the numeral 4 and is freely suspended through a narrow slot 5 of the table. The matrices which serve for forming one by one the rings of the top row are: The front matrix 6, the side matrices 7, 7, and the rear matrix 8. The first operation which follows the insertion of the cut length of wire 1 in front of the mandrel 3, is a forward movement of the matrix 6 toward the mandrel 3 in the direction of the arrow 9 in Fig. 2, for the purpose of bending the metal wire 1 into a U shape. The side matrices 7, 7 (see Fig. 3) then coöperate with the mandrel 3 so as to bend toward each other the extreme ends of the metallic wire 1 giving the latter the form of a U. The matrices 7, 7, are then moved away from the mandrel 3 (see Fig. 4) and the mandrel is lowered into the table of the machine, so that it does not project above its surface. The matrix 6 is then advanced and the open wire ring 1 is pushed forward while still resting upon the table in such a manner that the extreme ends of the ring enter into two adjacent rings 10 of the last row of the work, that is, the top row previously made. As may be seen from Fig. 4, the matrix 8 then advances toward the matrix 6 which pushes the ring forward, whereby the bent ends of the open ring are moved toward each other, so as to close completely the ring (see Fig. 5). The matrices 6 and 8 are then moved apart so as to release the new ring after the latter has been closed and connected to the work already produced. The comb supporting the work is then displaced by an amount approximately equal to the diameter of a ring in the direction of the arrow 11 (Fig. 1) so that a new ring may be formed next to the ring just produced. After a whole row of rings has been added, the work and the supporting comb are removed, and the rings of the row last produced are placed upon the hooks of another comb. The new comb is then together with the work introduced into the machine in place of the comb previously used and a new row of rings is produced in the manner hereinbefore described.

The figures which will now be referred to explain clearly the pinciple upon which the improved machine forming the subject of the present invention is built. The improved machine comprises two combs arranged one against the other and provided with downwardly extending hooks. The hooks of the two combs are arranged in staggered relation so as to support alternately the work. There is therefore no necessity to remove the work from the machine during the entire operation.

Fig. 6 shows in end elevation the two combs indicated by the numerals 12 and 12', one of which is alternately either above or below the other. In the position shown in Fig. 6 the comb 12 carries the work by means of the hooks 13 which engage the rings 10 of the row last completed. In this position the hooks 13' of the comb 12' have descended below the hooks 13 of the comb 12. The preparatory formation of the ring and the insertion of the two open ends thereof into two adjacent rings 10, 10, of the row last completed, take place in the same manner as above described with reference to Figs. 1 to 5, but in contradistinction to the method of manufacture hitherto used, the ring 1 is not only inserted into the two rings 10 of the last row but is at the same time bent or placed around the hook 13' of the second comb 12' which at this moment is situated at a lower level than the comb 12. It should be observed that the ring 1 which has just been formed and at the same time placed upon the hook 13' of the comb 12', rests upon the table of the machine (the upper surface of which is indicated by 14, 14,) while it is being formed and held between the matrices 6 and 8, but descends somewhat through the slot 5 of the machine and assumes an inclined position as soon as the matrices 6 and 8 move apart. The released ring rests as shown in Fig. 7 upon a hook 13' of the comb 12'.

When a new row of rings has been completed, each of the hooks 13' of the comb 12' stands within a ring of the said row so that the hooks 13' of the comb 12' are axactly in the position required for supporting the work by means of the top row of rings last made, it being only necessary to raise the comb 12' for this purpose and to lower the comb 12. After this movement of the two combs has been performed, the work is no longer suspended from the hooks 13 by means of the rings 10 but as shown in Fig. 8 is suspended by means of the rings 1 from the hooks 13' of the comb 12', the comb being as shown in Fig. 8, in an almost vertical position. It should however be added that it is not sufficient to raise and lower the combs but it is necessary to perform an additional movement by which the hooks 13 of the comb 12 are withdrawn from the rings 10 of the second row of rings. It has already been explained that while the comb 12' rises to support the work by means of its hooks 13', the comb 12 performs a downward movement. At the same time the comb 12 oscillates as shown in Fig. 8, and during the movement of oscillation the hooks 13 of the comb 12 are withdrawn from the rings 10 with which they were previously in engagement, so that the work is entirely suspended by the rings 1 last formed which now form the first or top row of rings. As soon as the hooks 13 of the comb 12 are thus disengaged from the work, which is now freely suspended from the hooks 13' of the comb 12', the comb 12 descends completely into the position shown in Fig. 9, and the comb 12' is raised to its extreme position. The position of the two combs is now the reverse of that shown in Fig. 6. The formation of a new top row of rings now takes place under the same conditions above described with the only difference that the rings 1, which are now made one by one so as to connect two adjacent rings of the top row already produced, are now placed around the hooks 13 of the comb 12 which do not yet support the work but are intended to support the same (as shown in Fig. 10) as soon as the new row of rings is finished and the hooks 13' of the comb 12' have been suitably lowered and oscillated and caused to assume the position shown in Fig. 6. The two combs are moved toward each other by a spiral spring 34 which as shown in Fig. 15, is connected to the upper ends of the combs.

Figs. 11, 12 and 13 are plans drawn to an enlarged scale and illustrate the successive relative positions assumed by the matrices 6, 7, 7, and 8, during the formation of a ring upon a machine having two combs provided with hooks and adapted to carry alternately the fabric so that the latter remains in the machine during the whole operation. Fig. 11 corresponds to Fig. 3 referred to above in connection with a machine having one comb only which is removed manually after the completion of a row of rings. Fig. 12 corresponds to Fig. 4 and shows the parts in the position which they assume immediately before the closing of the ring, while Fig. 13 corresponds to Fig. 5 and illustrates the stage at which the ring is already closed.

The means will now be described for alternately raising, lowering and oscillating the two combs carrying the work for the purpose of producing the operation above referred to, also the means for horizontally displacing the combs first in one direction for producing a row of rings and then in the other direction for making the next row. It will also be explained in what manner the number of rings constituting a row may be varied.

Fig. 14 shows a front view of the combs and means for moving the same, Fig. 15 is a cross section on line M—M of Fig. 14, Figs. 16 and 17 are detail views drawn to a larger scale of one of the combs, Fig. 18 is a plan illustrating the end pivots of the combs and their bearings, Fig. 19 illustrates in elevation means for moving the combs in a direction opposite to that assumed in Fig. 14, and Fig. 20 is a vertical section on line N N—P P of Fig. 14.

Each of the two combs which alternately carry the work, consists of an angle piece 12 or 12′ provided upon its outer face (compare Figs. 15, 16 and 17) with grooves for the reception of hooks 13 or 13′. These hooks are bent outwardly and are held in the grooves 16 by clamping plates 17 secured by means of the screws 18. The angle pieces 12 and 12′ are secured to angle pieces 19 by means of screws 20. Each angle piece 19 is formed with two end flanges 21 or 21′ as may be seen from Figs. 14, 15, 18 and 20. The end flanges 21 of the front comb having the hooks 13, are provided with pivots 22 mounted in rods 23 adapted to slide in casings 24. The end flanges 21′ of the rear comb which carries the hooks 13′ are provided with elbow pieces 25, 25′, carrying pivots 22′, which are mounted in rods 23′ adapted to slide in the casings 24.

The vertical displacement of the two combs is obtained by raising or lowering the pivots 22, 22 of one comb and at the same time lowering or raising the pivots 22′ 22′ of the other comb. This movement is effected by the following means. A cam (not shown in the drawings) acts by the intermediary of a rod 26′ upon the slide 23′ at the right-hand side of Fig. 14 as soon as the two combs have finished their horizontal movement to the right in which position the slide 23′ is above the rod 26′. The slide 23′ rises under the influence of the rod 26′ in the casing 24 and lifts by means of its pin 27′ a three-armed lever 28 pivoted at 29 in the casing. At the same time a pivot 27 upon the slide 23 causes the latter to descend during the upward movement of the slide 23′.

The three-armed lever 28 of the right-hand casing is connected by a rod 30 to a similar lever 28 of the left-hand casing which acts upon pins 27, 27′ of the slides 23, 23′. It will be seen that the slides 23′, 23′, in which the rear comb is mounted by means of the pivots 22′, 22′, rise or descend while the pivots 22, 22, carrying the front comb simultaneously perform the opposite movements.

When the combs finish their movement to the left the slide 23 assumes the position above the rod 26 and is lifted by the latter. The position shown in Fig. 14 is maintained during the whole movement of the two combs from the left to the right.

Each of the two casings 24, 24, is provided in its front wall with longitudinal slots or grooves 31, 31′, (see Figs. 14 and 18) in which the pivots 27, 27′, of the slides 23, 23′, move. These grooves also limit the upward and downward movement of the slides. The casings 24 are provided with supports 32 by means of which the whole apparatus above described may be fixed to slides 33 which serve for horizontally moving the combs. The oscillatory movement of a comb at the end of its horizontal stroke, by which the hooks are disengaged from the rings of the last but one row, is obtained by means of a projection 35 (see Fig. 20) provided upon one of the end flanges 21 of the front comb, and a pawl 36 mounted upon a lever 37 which is operated at the end of the horizontal movement of the comb by a cam 38 indicated in Fig. 20. The pawl 36 is held with its projection 40 against a stop 41 of the lever 37 by a spring 39. A similar pawl 36′ mounted upon a lever 37′ is actuated by a cam at the end of the opposite horizontal movement of the combs and coöperates with a projection 35′ of the end flange 21′ of the rear comb. The oscillatory movement is therefore produced by alternately moving the right end of one comb and the left end of the other comb.

The longitudinal movement of the combs is obtained by the following means. The casings 33 which carry the combs are mounted upon a stationary rail 42 carried in the frame of the machine. For the sake of clearness the frame of the machine is not indicated in the drawings. The casings 33 carry behind the fixed rod 42 a toothed rack 43 with which coöperate pawls so as to produce a step by step movement of the combs by an amount approximately equal to the diameter of a link. At the right end of the rack 43 (Fig. 14) is secured one end of a chain 45 which passes over a pulley 46 and carries a counterweight 47 indicated by an arrow. This counterweight produces a movement of the combs from the left to the right, the opposite movement, that is the movement from right to left being obtained by a pawl 48 in the following manner.

In the frame of the machine is fixedly mounted a casing 49 in which are arranged two vertical slides 50, 51 provided at the lower ends with inclined faces adapted to engage into the teeth of the rack 43. Each slide is actuated by a spring 52. A two-armed lever 53 is pivoted at 54 carries at one end a pin 55 which takes into a cam groove 56 of a disk 57 pivoted at 58. The pivots 55 and 58 are connected by a spring 59 in order to avoid an accidental displacement of the disk 57, which is arranged to oscillate only at the end of each horizontal stroke of the combs.

At the lower end of the fixed casing 49 is pivotally mounted at 61 a lever 60. A longitudinal slot 62 enables the lever 60 to perform a small longitudinal movement. The lever 60 is provided at one end with a raised portion 63 which may be moved downward by a slide 64, movably mounted in the casing 49 and actuated by a rod 65. This rod is actuated by a spiral spring 66 and a cam not shown in the drawings. The slide 64 is formed at its upper end with a nose 67 which moves below a projection 68 of the slide pawl 50. At its other end the lever 60 carries the pawl 48 mentioned above. The lever 60 abuts with the end carrying the pawl 48 against a screw 69 mounted in the upper end of a lever 70 pivoted at 71. This lever is actuated at its lower end by a cam so as to move the pawl 48 in the direction of the arrow 72.

The movement of the combs from the left to the right is obtained by the weight 47; the disk 57, the lever 53 and the pawls 50, 51 and 48, being then in the positions shown in Fig. 14. When a ring has been completed the rod 65 descends under the action of its spring 66, the cam controlling the movement of the rod 65 acting at that moment with a small radius. Consequently the slide 64 descends upon the tail 63 of the lever 60 and raises the pawl 48 out of engagement with the teeth of the rack 43. Immediately afterward the lever 70 is moved in the direction of the arrow 72 whereby the pawl 48 is advanced over the tooth placed immediately to the left of the tooth previously engaged by said pawl. This longitudinal movement of the pawl 48 is permitted by the provision of the said longitudinal slot 62 into which the pivot 61 of the lever 60 engages. The rod 65 is then raised by its cam whereby the slide 64 is also raised. The lever 60 is thus released and the pawl 48 drops upon the back of the tooth against the face of which it was resting immediately before. During its upward movement the slide 64 has actuated through its nose 67 and the projection 68, the slide pawl 50, which is thus moved out of engagement with the rack. The rack 43 and the combs secured thereto being released by the pawl 50 are moved by the counter-weight 47 and are displaced by a very small amount until the vertical face of the tooth into which the pawl 48 has already partly descended is arrested by said pawl. The combs have thus been fed by an amount approximately equal to the diameter of a link, and the formation of a new link may be commenced immediately.

When the combs have reached by a step by step movement the end of their stroke to the right, the stop 73 which is mounted upon the left casing 33 carrying the combs, strikes the cam disk 57. The cam groove 56 of said disk acts upon the pin 55 of the lever 53 and oscillates the latter whereby the pawl 50 is raised and the pawl 51 is simultaneously lowered. This position is shown in Fig. 19. At this moment the rod 26′ at the right hand side of Fig. 14 is opposite the slide 23′. The rod 26′ is now lifted and causes the upward movement of one comb and the simultaneous downward movement of the other comb, also the oscillation of one of the combs.

It should be observed that when one of the slide pawls 50 engages into a tooth of the rack 43, the other slide pawl 51 is placed opposite the interval between two adjacent teeth so that at the end of each complete stroke of the combs a longitudinal displacement takes place corresponding to half a tooth of the rack, or the radius of a link. This movement is required as the rings of each row are in staggered relation with regard to the rings of the previous row.

It will be seen from the foregoing that at the end of each stroke and before the formation of the first ring of a new row the combs recede by an amount equal to the radius of a ring, the rack being displaced by half a tooth before abutting against the slide pawl 51 (or 50) which enters into action.

The oscillation which the lever 53 performs at the end of the movement of the combs to the right, causes also the upward movement of the slide 64 by the intermediary of the lateral projection 74. The slide 64 cannot therefore act upon the tail 63 of the lever 60 and the pawl 48 may therefore move up and down and feed the combs from the right to the left without any interference on the part of the slide 64.

Immediately after the formation of the first ring of a row which is made during the movement of the combs from the right to the left, the lever 70 is moved in the direction of the arrow 72 and pushes the pawl 48 whereby the rack is fed by one tooth. The slide pawl 50 is idle but the pawl 51 is in engagement with the rack and prevents the return movement of the combs under the action of the weight 47. After the formation of each ring the combs are thus fed by one tooth to the left.

When the combs have reached the end of the movement to the left the stop 73′ strikes the cam 57 which produces an oscillation of the lever 53 in the opposite direction and causes the various parts of the mechanism to resume again the position shown in Fig. 14. A new movement to the right may now take place.

It will be seen from Figs. 14 and 20 that the screws 75 and 76 enable a suitable adjustment of the combs and their hooks to be obtained with regard to the table and the matrices which are moved along the latter in the longitudinal direction without any lateral displacement, although the rings are made upon hooks arranged in staggered relation. This adjustment is possible owing to the fact mentioned above that the combs are displaced by an amount corresponding to the radius of a ring at the end of each travel.

I claim:

1. In a machine for making chain mail fabric comprising means for forming successive rows of rings, means for supporting the fabric comprising two combs having suspending hooks, and means for alternately operating the combs adapted after the completion of each row of rings to lift the inactive comb so that its hooks support the newly-formed rings to displace the other comb to free its hooks from the previous row of rings, and finally to lower the latter comb to bring its hooks beneath the plane in which the next row of rings will be formed, so that the now inactive comb will have its hooks inclosed within the rings of such next row.

2. In a machine for making chain mail fabric comprising means for forming successive rows of rings, means for supporting the fabric comprising two combs having suspending hooks, said combs having end pivots, and means for operating the combs comprising members engaging said pivots, such members movable alternately in vertical directions with means for so moving them, and means adapted to oscillate the combs upon said pivots.

3. In a machine for making chain mail fabric comprising means for forming successive rows of rings, means for supporting the fabric comprising two combs having suspending hooks, said combs having end pivots, said pivots located upon the same axis in the intermediate positions of the combs, and means for operating the combs comprising vertically movable slides carrying the pivots of the respective combs, means for vertically reciprocating the slides to alternatively lift and lower the combs, and means for oscillating the combs on said pivots.

4. In a machine for making chain mail fabric comprising means for forming successive rows of rings, means for supporting the fabric comprising two combs having suspending hooks, said combs adapted to move vertically and to oscillate, means for imparting alternate rising and falling movements to the combs, and means for oscillating the combs comprising a lever and pawl, the latter engaging the comb to impart oscillation thereto.

5. In a machine for making chain mail fabric comprising means for forming successive rows of rings, means for supporting the fabric comprising two combs having suspending hooks, said combs adapted to move vertically and to oscillate, means for imparting alternate rising and falling movements to the combs comprising opposite pairs of slides, levers having opposite arms engaging said slides to lift those of one comb and lower those of the other, and means for operating said slides after the formation of each row of rings.

6. In a machine for making chain mail fabric comprising means for forming successive rows of rings, means for supporting the fabric comprising two combs having suspending hooks, said combs adapted to move vertically and to oscillate, means for imparting alternate rising and falling movements to the combs, means for oscillating the combs, and actuating devices for operating said means adapted to act upon the completion of each row of rings.

7. In a machine for making chain mail fabric comprising means for forming successive rows of rings, means for supporting the fabric comprising two combs having suspending hooks, said combs adapted to move vertically, means for imparting alternate rising and falling movements to the combs, and actuating devices for operating such means upon the completion of each row of rings, comprising lifters at opposite sides located respectively in coincidence with the position of a liftable part of said means when the combs reach their extreme position.

8. In a machine for making chain mail fabric comprising means for forming successive rows of rings, means for supporting the fabric comprising two combs having suspending hooks, said combs adapted to move vertically, means for imparting alternate rising and falling movements to the combs comprising vertically moving slides carrying the opposite ends of the respective combs, and connecting means for depressing the slides of one comb upon the elevation of the slides of the other comb, and actuating devices comprising lifters at opposite sides located coincidently with the extreme position of the slide to be lifted, whereby upon the completion of each row of rings such slide arriving over the lifter is lifted and the slide of the other comb depressed.

9. In a machine for making chain mail fabric, feeding mechanism for displacing the fabric support step by step, comprising a traveling slide, a weight tending to move the slide in one direction, escapement mechanism for controlling its intermittent movement in such direction, and ratchet and pawl mechanism for propelling it in the contrary direction, with means for shifting from one mechanism to the other at each end of the feed.

10. In a machine for making chain mail fabric, feeding mechanism for displacing the fabric support step by step, comprising a traveling slide, a weight tending to move the slide in one direction, a toothed rack carried by the slide, and pawls engaging said rack comprising a feeding pawl and means for moving it longitudinally of the rack, and stop pawls adapted to hold the rack after each feeding movement, with shift mechanism at each end of the travel of the slide to reverse the feed.

11. In a machine for making chain mail fabric, feeding mechanism for displacing the fabric support step by step, comprising a traveling slide, a weight tending to move the slide in one direction, a toothed rack carried by the slide, and pawls engaging said rack comprising a feeding pawl and means for moving it longitudinally of the rack, and stop pawls adapted to hold the rack after each feeding movement, with means at each end of the travel of the slide for lifting one stop pawl and lowering the other.

12. In a machine for making chain mail fabric, feeding mechanism for displacing the fabric support step by step, comprising a traveling slide, a weight tending to move the slide in one direction, a toothed rack carried by the slide, and pawls engaging said rack, an oscillating lever carrying one of said pawls, cam-actuated means for oscillating said lever, and a cam-actuated means for displacing said lever and pawl longitudinally of the rack.

13. In a machine for making chain mail fabric, feeding mechanism for displacing the fabric support step by step, comprising a traveling slide, a weight tending to move the slide in one direction, a toothed rack carried by the slide, and pawls engaging said rack, two of said pawls being alternately active and inactive, the inactive pawl coinciding with the middle of the tooth of the rack, and shifting means for reversing the pawls, whereby on reversing the travel the rack is displaced by half a tooth before the feed in the opposite direction is commenced, to provide for the staggered relation of the rings of the successive rows.

In witness whereof, I have hereunto signed my name in the presence of two subscribing witnesses.

NAPOLEON CHARGUERAUD.

Witnesses:
DAVID C. POOLE, Jr.,
RENÉ BARDY.

Copies of this patent may be obtained for five cents each, by addressing the "Commissioner of Patents, Washington, D. C."